(12) United States Patent
Hong

(10) Patent No.: US 10,721,685 B2
(45) Date of Patent: Jul. 21, 2020

(54) APPARATUS AND METHOD FOR CONTROLLING TRAFFIC TRANSMISSION TIME IN ELECTRONIC DEVICE

(71) Applicant: Samsung Electronics Co., Ltd., Suwon-si, Gyeonggi-do (KR)

(72) Inventor: Youngki Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 15/560,381

(22) PCT Filed: Apr. 18, 2016

(86) PCT No.: PCT/KR2016/004020
§ 371 (c)(1),
(2) Date: Sep. 21, 2017

(87) PCT Pub. No.: WO2016/167631
PCT Pub. Date: Oct. 20, 2016

(65) Prior Publication Data
US 2018/0070310 A1   Mar. 8, 2018

(30) Foreign Application Priority Data

Apr. 16, 2015  (KR) .................. 10-2015-0054055

(51) Int. Cl.
*H04W 52/02* (2009.01)
*H04W 72/12* (2009.01)
*H04L 29/08* (2006.01)

(52) U.S. Cl.
CPC ......... *H04W 52/0216* (2013.01); *H04L 67/32* (2013.01); *H04L 67/325* (2013.01);
(Continued)

(58) Field of Classification Search
CPC ......... H04W 52/0216; H04W 52/0264; H04W 52/027; H04W 52/0274; H04W 72/1242;
(Continued)

(56) References Cited

U.S. PATENT DOCUMENTS

2009/0132754 A1* 5/2009 Riska .................... G06F 3/0611
711/103
2011/0305264 A1 12/2011 Chhabra et al.
(Continued)

FOREIGN PATENT DOCUMENTS

EP    2 851 798 A1    3/2015
WO    2008/124041 A2   10/2008

*Primary Examiner* — Pao Sinkantarakorn
*Assistant Examiner* — Kabir U Jahangir
(74) *Attorney, Agent, or Firm* — Jefferson IP Law, LLP

(57) ABSTRACT

The present invention relates to an apparatus and a method for controlling traffic transmission time in an electronic device, and particularly, to an apparatus and a method for controlling traffic transmission time through alarm control in an electronic device. A method according to one embodiment of the present invention is a method for transmitting background traffic of an application installed in an electronic device having a communication function, and may comprise the steps of: when requested to store an alarm for transmission of background traffic by a predetermined application, setting one scheduling method among two or more scheduling methods depending on the characteristics of the traffic; generating and storing a scheduled alarm occurrence time by scheduling a requested alarm occurrence time on the basis of the determined scheduling method and a reference synchronization cycle; and, when the stored alarm time arrives, providing alarm information to the relevant application so that the background traffic can be transmitted.

20 Claims, 9 Drawing Sheets

(52) U.S. Cl.
CPC ... *H04W 72/1242* (2013.01); *H04W 72/1252* (2013.01); *H04W 72/1268* (2013.01); *Y02D 70/00* (2018.01); *Y02D 70/142* (2018.01); *Y02D 70/144* (2018.01); *Y02D 70/166* (2018.01); *Y02D 70/26* (2018.01)

(58) Field of Classification Search
CPC .......... H04W 72/1252; H04W 72/1268; H04L 67/325; H04L 67/32; Y02D 70/26; Y02D 70/166; Y02D 70/142; Y02D 70/144; Y02D 70/00
See application file for complete search history.

(56) References Cited

U.S. PATENT DOCUMENTS

| | | |
|---|---|---|
| 2012/0158908 A1 | 6/2012 | Luna et al. |
| 2013/0044658 A1 | 2/2013 | Zhu et al. |
| 2013/0055273 A1* | 2/2013 | Hong .................... H04L 67/325 718/102 |
| 2014/0086233 A1 | 3/2014 | Chhabra et al. |
| 2014/0204718 A1 | 7/2014 | Heinberg et al. |
| 2014/0368332 A1 | 12/2014 | Hong et al. |
| 2015/0121383 A1 | 4/2015 | Gou et al. |

* cited by examiner

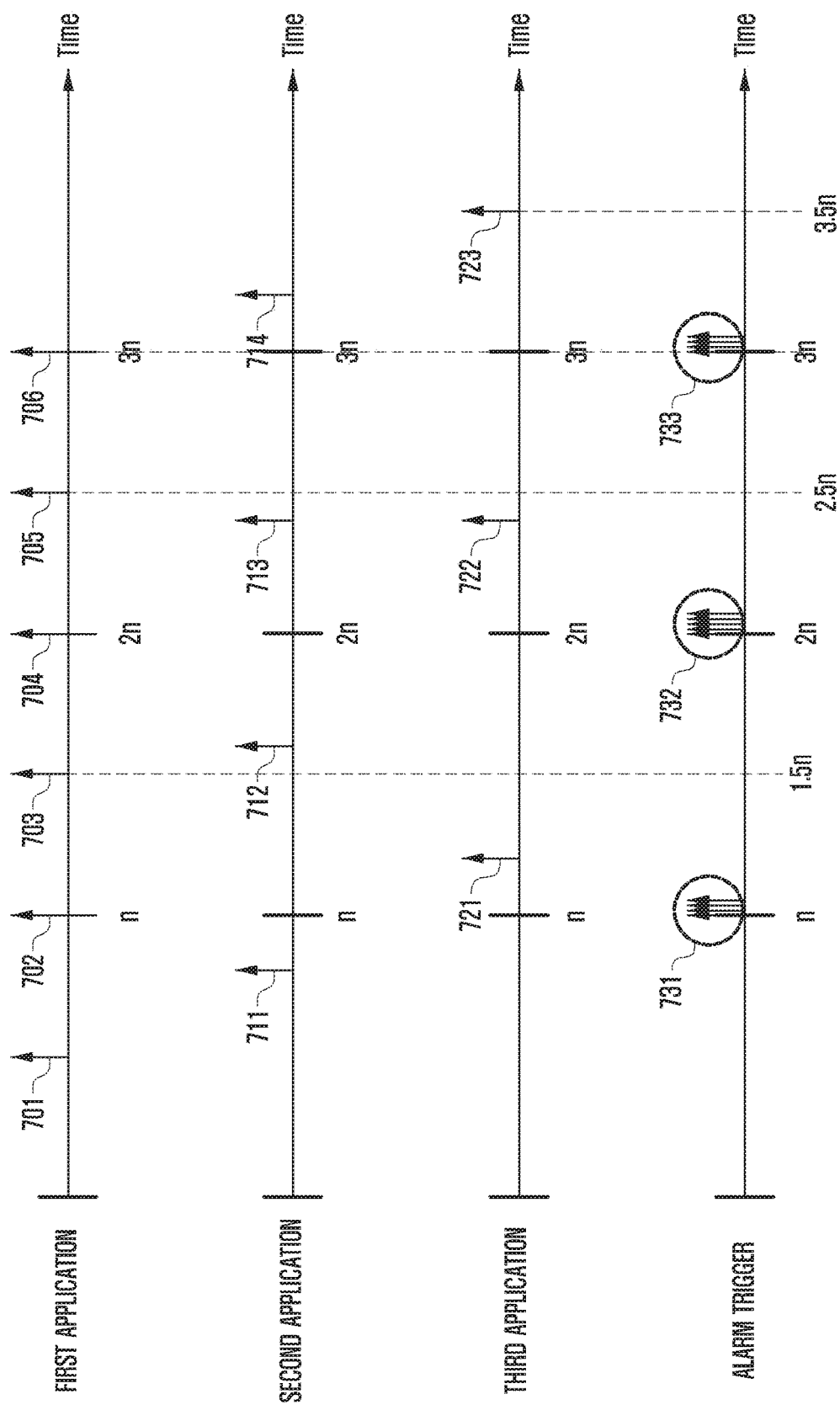

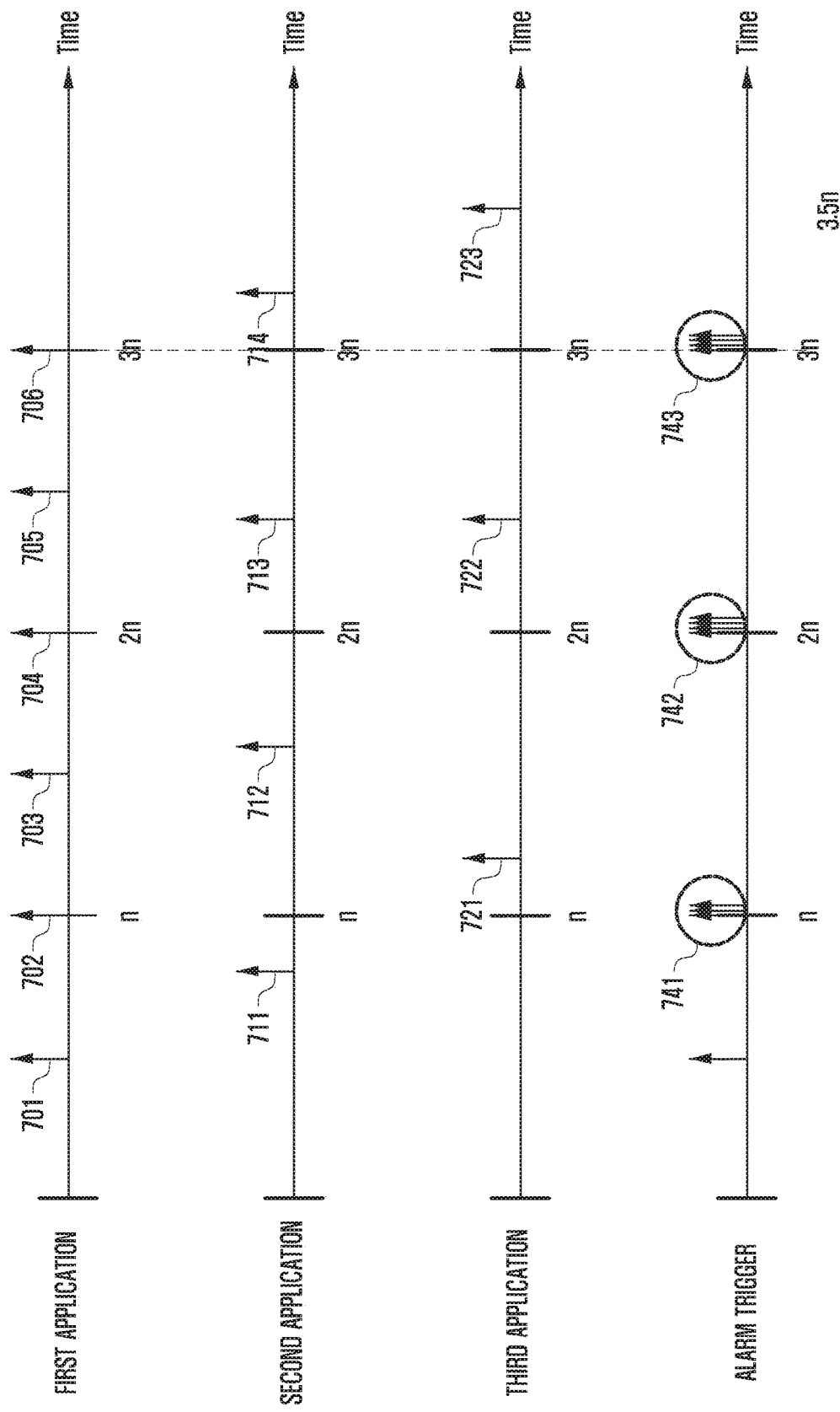

APPARATUS AND METHOD FOR CONTROLLING TRAFFIC TRANSMISSION TIME IN ELECTRONIC DEVICE

TECHNICAL FIELD

The present invention relates to an apparatus and a method for controlling traffic transmission time in an electronic device, and more particularly, to an apparatus and a method for controlling traffic transmission time through alarm control in an electronic device.

BACKGROUND ART

With the development of electronic technology and communication technology, electronic devices capable of performing wireless communication have been widely used in our daily lives. Various types of application programs (hereinafter referred to as "applications") may be generally installed in such electronic devices capable of performing wireless communication. Such applications may be installed in advance in electronic devices by manufacturers of the electronic devices, or may be downloaded from specific servers onto the electronic devices as needed by users.

On the other hand, most electronic devices capable of performing wireless communication are portable electronic devices. For convenient portability of portable electronic devices, such as cellular phones, smart phones, tablet computers, and a notebook computers, many efforts have been made to achieve miniaturization and low power consumption of the portable electronic devices.

Further, the electronic devices capable of performing wireless communication have gradually reached a stage in which they can perform functions that are the same as or similar to the functions of the computers. Accordingly, most users are operating various types of applications using smart phones or tablet computers. Such applications may be periodically awaken to perform communication with a specific node of a network even if the electronic device is in an idle state.

As described above, if the electronic device is periodically awaken from an idle state and performs communication with the specific node of the network, it inevitably consumes power, and if respective applications are awaken at different times or at different time intervals to request traffics, waiting time in which the electronic device can be used is reduced.

DISCLOSURE OF INVENTION

Technical Problem

An aspect of the present invention provides an apparatus and a method for controlling an alarm generation time of applications installed in an electronic device.

Another aspect of the present invention provides an apparatus and a method capable of reducing power consumption of an electronic device through control of alarm times of applications installed in the electronic device.

Still another aspect of the present invention provides an apparatus and a method capable of reducing power consumption of an electronic device through control of transmission times of traffics in an electronic device.

Yet still another aspect of the present invention provides an apparatus and a method capable of reducing power consumption of an electronic device through control of transmission times of traffics if applications of an electronic device request periodic traffics.

Solution to Problem

In one aspect of the present invention, a method for transmitting a background traffic of an application installed in an electronic device having a communication function includes determining one of two or more scheduling methods in accordance with characteristics of the background traffic if storage of an alarm for transmitting the background traffic is requested by a specific application; scheduling an alarm generation time requested on the basis of the determined scheduling method and a reference sync interval and generating and storing the scheduled alarm generation time; and providing alarm information to the corresponding application to transmit the background traffic if the stored alarm time arrives.

In another aspect of the present invention, an alarm scheduling method for transmitting a background traffic of an application installed in an electronic device includes determining one of two or more scheduling methods in accordance with characteristics of the background traffic if storage of an alarm for transmitting the background traffic is requested from a specific application; scheduling an alarm generation time requested on the basis of the determined scheduling method and a reference sync interval, and generating the scheduled alarm generation time; storing the generated alarm generation time together with corresponding application information; and providing alarm information to the corresponding application if the stored alarm time arrives.

In still another aspect of the present invention, an electronic device for transmitting a background traffic of an application includes a communication interface configured to perform communication with a server or another electronic device through a specific communication network; a memory configured to store at least one application for transmitting the background traffic and a scheduler program for providing an alarm to the application; and a processor configured to operate the application, to determine one of two or more scheduling methods in accordance with characteristics of the background traffic if storage of the alarm for transmitting the background traffic is requested during an operation of the application, to schedule an alarm generation time requested on the basis of the determined scheduling method and a reference sync interval and to generate and store the scheduled alarm generation time, and to provide alarm information to the corresponding application if the stored alarm time arrives.

Advantageous Effects of Invention

The electronic device according to the present invention can reduce current consumption due to the application. In particular, as the number of applications installed in the electronic device becomes larger, the current consumption reduction effects can be increased.

BRIEF DESCRIPTION OF DRAWINGS

FIG. 7A is an exemplary diagram explaining a case where alarm times are scheduled in a rounding method according to the present invention;

FIG. 7B is an exemplary diagram explaining a case where alarm times are scheduled in a ceiling method according to the present invention.

MODE FOR THE INVENTION

Figure 1:
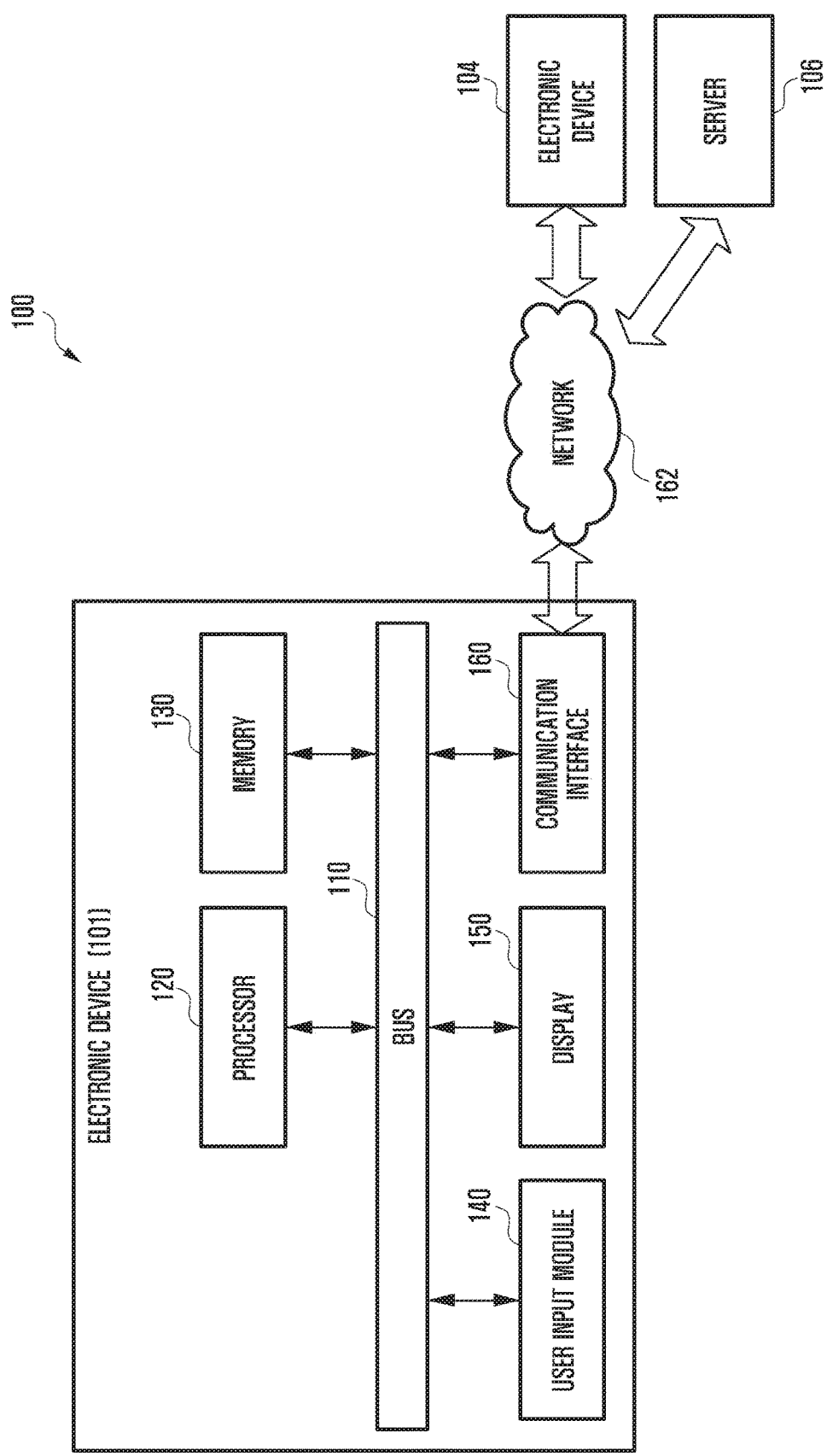
FIG. 1 is a schematic block diagram of an electronic device to which the present invention is applied, exemplarily illustrating correlation with a network.

Hereinafter, various embodiments of the present invention will be described in detail with reference to the accompanying drawings. It should be noted that the same drawing reference numerals are used for the same elements across various figures. Further, the accompanying drawings are provided to help understanding of the present invention, and it should be noted that the present invention is not limited to the form or deployment as exemplified in the drawings. Further, in describing the present invention, related well-known functions or configurations are not described in detail in the case where it is determined that they obscure the subject matter of the present invention. In the following description, explanation will be made only with respect to a portion that is necessary in understanding the operation according to various embodiments of the present invention, and explanation of other portions will be omitted not to obscure the subject matter of the present invention.

Prior to the explanation of the present invention, applications installed in an electronic device will be described. As described above, various applications may be installed in an electronic device, such as a smart phone. In the case where various applications, such as a mail client, a social network service (SNS) client, and an instant messaging (IM) client, are installed in the electronic device, they may be individually operated.

On the other hand, such applications may be connected to a network in a background to synchronize data possessed by the applications with data possessed by an opposite party (server). Further, in order to receive an instant notification or data from a server, client applications installed in the electronic device may continuously maintain a connection state with the server through sending and receiving a keep-alive message. For this, each application may register a schedule of a predetermined interval or an interval selected by a user in a system service (e.g., alarm manager service) using an alarm in accordance with the purpose of the service of the corresponding application, and if the alarm is triggered to receive an alarm notification from the system service, it performs a task of transmitting and receiving a data sync or keep-alive message.

On the other hand, if communication is not specially requested, the electronic device is set to an idle mode in order to reduce power consumption. Whenever each application transmits or receives the data sync or keep-alive message, a terminal is switched from an idle mode to an active mode. Accordingly, if a plurality of applications set schedules for transmitting data at different intervals, the number of switching times from the idle mode to the active mode is increased, and thus the power consumption is increased. For example, if it is assumed that average current of 20 to 30 mA is consumed in the case where one application is installed in a specific electronic device, average current of 70 to 80 mA is consumed in the case where 30 applications are installed in the electronic device. This is because the respective applications request switching to the active mode at different times, and thus much more power is consumed as a result.

Hereinafter, an apparatus and a method capable of reducing power consumption in an electronic device according to the present invention will be described. Further, it is assumed that the electronic device to be described hereinafter is a smart phone. However, in addition to the smart phone, it should be noted that the present invention can be applied to any electronic device in which a plurality of applications can be installed and each of the applications requires a periodic alarm.

FIG. 1 is a schematic block diagram of an electronic device to which the present invention is applied, exemplarily illustrating correlation with a network.

Referring to FIG. 1, an electronic device 100 may include a bus 110, a processor 120, a memory 130, a user input module 140, a display module 150, and/or a communication module 160.

The bus 110 may be a circuit which connects respective constituent elements included in the electronic device 100 of FIG. 1 with each other to perform communication between the constituent elements, for example, to transfer a control message or data. The processor 120 is a control module to perform the overall control of the electronic device 100, and to receive and analyze various inputs, such as reception of a specific command input by a user, reception of a specific command from a network, and a request for a predetermined operation from an application. Further, the processor 120 may interpret the input, and then may execute an operation or data process or may control the electronic device 100 corresponding to the result of the interpretation. Further, the processor 120 may output the result of the input command through another module or device in accordance with the kind of the input command. In particular, the processor 120 may perform traffic transmission control or alarm control to be described later according to the present invention. Further, the processor 120 may include a storage region (not illustrated in FIG. 1) therein.

The memory 130 includes regions in which various kinds of control data that are necessary to operate the electronic device 100, commands generated from other constituent elements included in the electronic device 100, control data, and user data can be stored. Further, the memory 130 may store therein program modules to be operated by layers in the processor 120. Examples of such program modules may include middleware, an application programming interface (API), and applications.

Further, such programming modules stored in the memory 130 may be composed of software, firmware, hardware, or a combination of at least two of them. For example, the programming modules stored in the memory 130 are loaded into the processor 120 to be actually operated by the processor 120.

The memory 130 may be divided into types of a built-in memory and an external memory, and may include at least one of the built-in memory and the external memory. As an example, the built-in memory may include at least one of a volatile memory (e.g., dynamic RAM (DRAM), static RAM (SRAM), or synchronous dynamic RAM (SDRAM)) and a nonvolatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, or NOR flash memory). As another example, the built-in memory may be in the form of a solid state drive (SSD). The external memory may include a flash drive (e.g., compact flash (CF), secure digital (SD), micro secure digital (micro-SD), mini secure digital (mini-SD), extreme digital (xD), or memory stick).

The user input module 140 may receive, for example, a command or data from a user, and may transfer the command or data to the processor 120 or the memory 130 through the bus 110. The user input module 140 may be configured in various types, such as a specific key type, touch screen type, touchpad type, electronic pen input type, and voice input type, and may be composed of a combination of two or more of the above-described configurations.

The display 150 may display an image, video, or data to the user. The display 150 may be, for example, a liquid crystal display (LCD) or an active-matrix organic light-emitting diode (AM-OLED). Further, the display 150 may be implemented in a flexible, transparent, or wearable manner. Further, the display 150 may be configured as one module together with the user input module 140. Further, the display 150 may be implemented by a hologram device. Here, the hologram device means a device that can display a stereoscopic image in the air using light interference. The display 150 may further include a control circuit configured to control the display 150.

The communication module 160 may perform communication between an electronic device 101 and another electronic device 104. The communication module 160 may perform communication with a specific short-distance communication protocol (e.g., wireless fidelity (WiFi), Bluetooth (BT), or near field communication (NFC) or a specific network 162. As methods for communicating with the network 162, various types of communications, such as Internet, local area network (LAN), wire area network (WAN), telecommunication network, cellular network, satellite network, and plain old telephone service, can be supported.

On the other hand, the electronic device 104 exemplified in FIG. 1 may be the same (e.g., same type) device as the electronic device 101 or may be a different (e.g., different type) device from the electronic device 101.

It should be noted that the constituent elements of the electronic device 101 as exemplified in FIG. 1 are only the constituent elements that are necessary in explaining the present invention, and constituent elements that are unnecessary in explaining the present invention are excluded.

Figure 2:
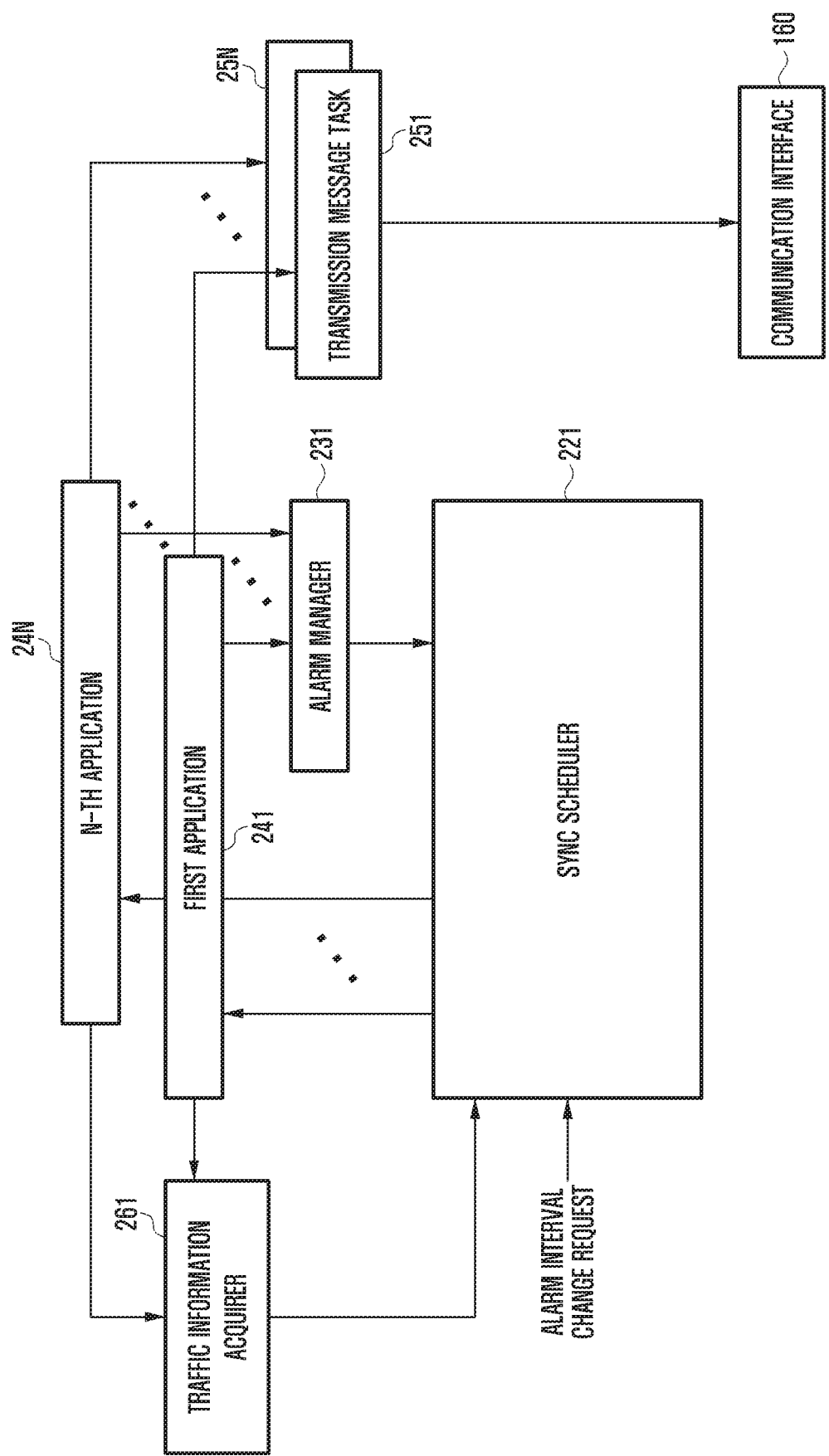
FIG. 2 is a block diagram of an electronic device for processing periodic or non-periodic data transmission events of respective applications according to the present invention.

FIG. 2 is a block diagram of an electronic device for processing periodic or non-periodic data transmission events of respective applications according to the present invention.

First, it should be noted that configurations as illustrated in FIG. 2 are configurations that are necessary for periodic or non-periodic data transmission in a background state required by applications or characteristics of the applications other than configurations for general communication, such as user's request or call destination. Further, other configurations excluding the communication interface 160 as exemplified in FIG. 2 may be programming modules that are stored in the memory 130 and are operated by the processor 120 as described above with reference to FIG. 1. Hereinafter, for convenience in explanation, it is assumed that the configurations are operated by the processor 120.

First to N-th applications 241 to 24N may be applications installed in the electronic device 101. The respective applications 241 to 24N may be applications that are necessary for data transmission in a periodic or non-periodic background state. The applications 241 to 24N may be, for example, various types of programs, such as an e-mail program, various kinds of game programs, chatting programs, social network service (SNS) programs, and navigation program. The respective applications 241 to 24N are required to periodically or non-periodically transmit data to another electronic device 104 or a server 106 through the network 162. Generally, the applications 241 to 24N transmit data to the server 106 in a predetermined time unit. That is, the applications 241 to 24N are required to transmit the data at intervals set (or required) by applications.

The respective applications 241 to 24N generate messages for requesting periodic or non-periodic alarm notification and provide the generated messages to an alarm manager 231. If the messages for requesting the alarm notification are received from the respective applications 241 to 24N, the alarm manager 231 converts the messages into forms that can be recognized by a sync scheduler 221 and provides the converted messages to the sync scheduler 221. If the sync scheduler 221 can interpret the alarm notification request messages received from the respective applications 241 to 24N, the alarm manager 231 can be omitted. Further, according to circumstances, the alarm manager 231 may be included in the sync scheduler 221.

If the alarm notification request messages are received from the alarm manager 231, the sync scheduler 221 may schedule a requested alarm based on respective application information, and may generate and store an alarm list so as to generate an alarm at a scheduled time. Further, the sync scheduler 221 may provide the alarm to the corresponding application whenever the alarm is necessary based on the scheduled information stored in the alarm list.

On the other hand, the sync scheduler 221 may receive an alarm interval change request signal from another program of the electronic device. In this case, the sync scheduler 221 may update prepared reference sync intervals. Further, the reference sync intervals may be changed to specific types by predetermined parameters or on the basis of a predetermined rule. This will be described in more detail with reference to the accompanying drawings to be described later.

Then, the respective applications may request transmission message tasks 251 to 25N to transmit messages when an alarm is provided thereto. In this case, the messages may be messages that the respective applications 241 to 24N should transmit. When messages to be transmitted are received from the respective applications 241 to 24N, the transmission message tasks 251 to 25N generate and provide message contents, destination address, application information, and subscriber information to the communication interface 160.

On the other hand, in FIG. 2, the transmission message tasks 251 to 25N are exemplified in the form in which one transmission message task exists corresponding to one application. As exemplified in FIG. 2, it may be called an application dispersion method that one transmission message task exists correspond to one application. In contrast, a centralized method may be selected so that one transmission message task performs traffic transmission of all applications 241 to 24N.

As another example, a combined method may be applied. There may exist a case where applications in which the centralized method is possible and applications in which traffics should be transmitted only in the dispersion method coexist. In this case, one transmission message task for transmitting traffics of applications in which the centralized method is possible and respective transmission message task(s) corresponding to applications in which traffics should be transmitted only in the dispersion method may be provided. In the case where the combined method is applied, at least two transmission message tasks are necessary.

The communication interface 160 receives a message that is requested to be provided to a specific server or another electronic device from at least one transmission message task, and processes the message in the form to be transmitted to the corresponding server or electronic device through a specific network 162. Processing of the message to be transmitted from the communication interface 160 to the server or electronic device may differ depending on the type of the network 162. For example, if the network 162 is a cellular network, the communication interface 160 processes data to match the communication standards of a cellular network, whereas if the network 162 is a WiFi network, the communication interface 160 processes the data to match the communication standards of a WiFi network. Thereafter, the communication interface 160 may transmit the processed message to the corresponding server or electronic device through the network 162.

Further, in the present invention, the sync scheduler 221 may determine the scheduling method at an alarm generation time in accordance with the characteristics of the message or the characteristics of the traffic that is requested for each application. In order to determine the scheduling method as described above, traffic information corresponding to an alarm for each application may be used. Accordingly, the traffic information acquirer 261 may acquire the traffic information corresponding to the alarm or corresponding to the respective applications 241 to 24N from the respective applications 241 to 24N. The traffic information acquirer 261 provides the acquired traffic information for each application to the sync scheduler 221.

In FIG. 2, it is exemplified that one traffic information acquirer 261 is provided. However, like the transmission message task as described above, one traffic information acquirer 261 may be configured in the case of the centralized method, and plural traffic information acquirers may be configured for the respective applications in the case of the dispersion method. The traffic information acquires may also be configured in the case of the combined method.

Further, the traffic information acquirer 261 may acquire the characteristics of the traffic directly from the respective applications, and if the alarm is triggered after an initial alarm registration request, it may acquire and provide pattern information, such as traffic occurrence characteristics or intervals through observing the traffic occurring in the application. If the traffic information acquirer 261 acquires the characteristics of the traffic directly from the respective applications, the sync scheduler 221 may immediately determine the scheduling method when the alarm registration is requested. In contrast, if the traffic information acquirer 261 does not acquire the characteristics of the traffic directly from the respective applications, but observes and acquires the traffic occurring in the applications, the sync scheduler 221 may determine the scheduling method in a predetermined method before acquiring the characteristic information of the traffic from the traffic information acquirer 261, and may determine the scheduling method to match the characteristics of the traffic after acquiring the characteristic information of the traffic.

Figure 3:
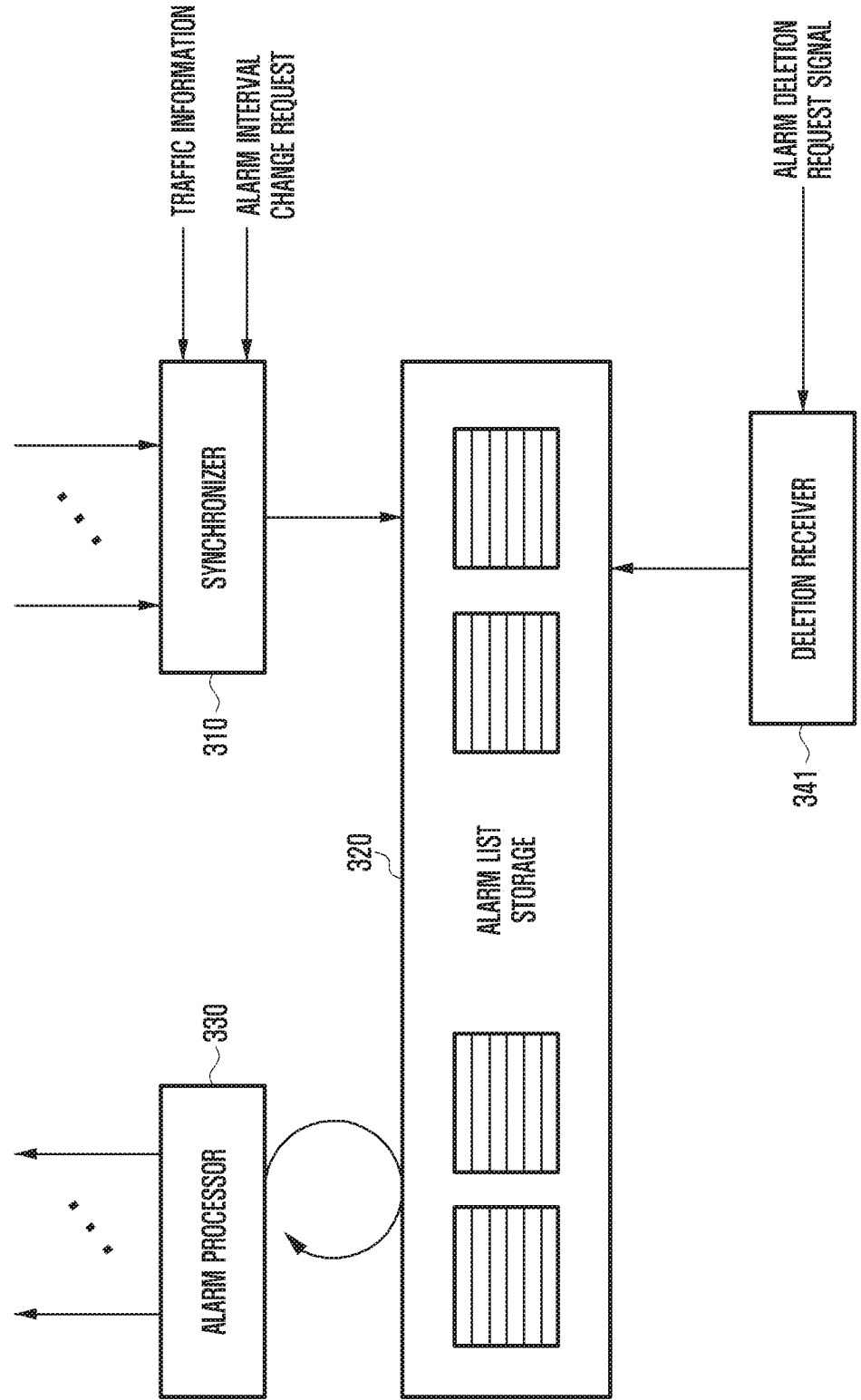
FIG. 3 is a block diagram illustrating the internal configuration of a sync scheduler according to the present invention.

FIG. 3 is a block diagram illustrating the internal configuration of a sync scheduler according to the present invention.

A synchronizer 310 may generate predetermined interval information, or may receive the interval information from another application or an operating system of an electronic device. Accordingly, it is assumed that the synchronizer 310 has predetermined interval information. Here, the interval may be a reference sync interval, and the reference sync interval may be a variable value. For example, if a waiting time in which a pattern that a user uses the electronic device or the electronic device is not used, for example, a screen-off time of the display 150, is lengthened, a longer interval may be determined. More specifically, if it is assumed that a reference sync interval determined within one hour after the screen-off of the display 150 is T1, and a reference sync interval determined within 1 to 3 hours after the screen-off of the display 150 is T2, the interval T1 and the interval T2 may be different from each other. Further, the synchronizer 310 may receive a reference sync interval value from outside, or may calculate and determine the reference sync interval on the basis of a predetermined parameter to update the reference sync interval. This will be described in more detail with reference to the drawings to be described later.

The synchronizer 310 receives a message or a signal for requesting alarm notification from a specific application or an alarm manager 231. In this case, the message or signal for requesting the alarm notification may include corresponding application information and interval information to be transmitted from the application to the background. Further, as described above, the synchronizer 310 may receive the traffic characteristic information from the traffic information acquirer 261. Accordingly, the synchronizer 310 may determine the alarm sync method on the basis of the received traffic information along with or after the message or signal for requesting the alarm notification.

The alarm sync method according to the present invention may be determined as one of a rounding method, a ceiling method, and a floor method. For example, if the traffic characteristic or pattern provided from the traffic information acquirer 261 is a long-alive TCP connection, the rounding method according to the present invention may be applied. Further, if registration of an alarm having the periodic characteristic that is larger than the reference time according to the present invention as much as a predetermined value is requested, the floor method may be applied. Last, with respect to all alarms that do not satisfy the above-described conditions or the remaining traffic characteristics or patterns excluding the rounding method, the ceiling method may be applied. The sync methods will be described in more detail with reference to the drawings to be described later.

Further, the synchronizer 310 may determine the sync method, and then may schedule an alarm generation time in accordance with the determined sync method to store the scheduled alarm generation time in the alarm list storage 320. That is, the synchronizer 310 generates the alarm generation time through changing the requested alarm time, and stores the generated alarm generation time in the alarm list storage 320.

The alarm list storage 320 may generate one alarm list corresponding to one alarm request from the application, or may generate and store two or more alarms for the same application. Hereinafter, for convenience in explanation, it is assumed that one alarm list is stored corresponding to one alarm request.

Further, the respective alarm lists stored in the alarm list storage 320 may be deleted by a deletion receiver 341. The deletion receiver 341 may receive a deletion request due to various causes, such as the operation of a specific application, deletion of the corresponding application, and interruption of the use of the corresponding application by the user. Such a deletion request signal is received in the deletion receiver 341, and the alarm list stored in the alarm list storage 320 may be deleted by the deletion receiver 341.

The alarm processor 330 checks alarm lists stored in the alarm list storage 320, and if it is required to provide an alarm to a specific application, it provides the alarm to the corresponding application.

The application that has received the alarm generates data to be transmitted in a background state as shown in FIG. 2, and transfers the data to the transmission message tasks 251 to 25N. Accordingly, the transmission message tasks 251 to 25N may transmit the data to a specific server or electronic device through the network 162 through providing the data to be transmitted to the communication interface 160.

Figure 4:
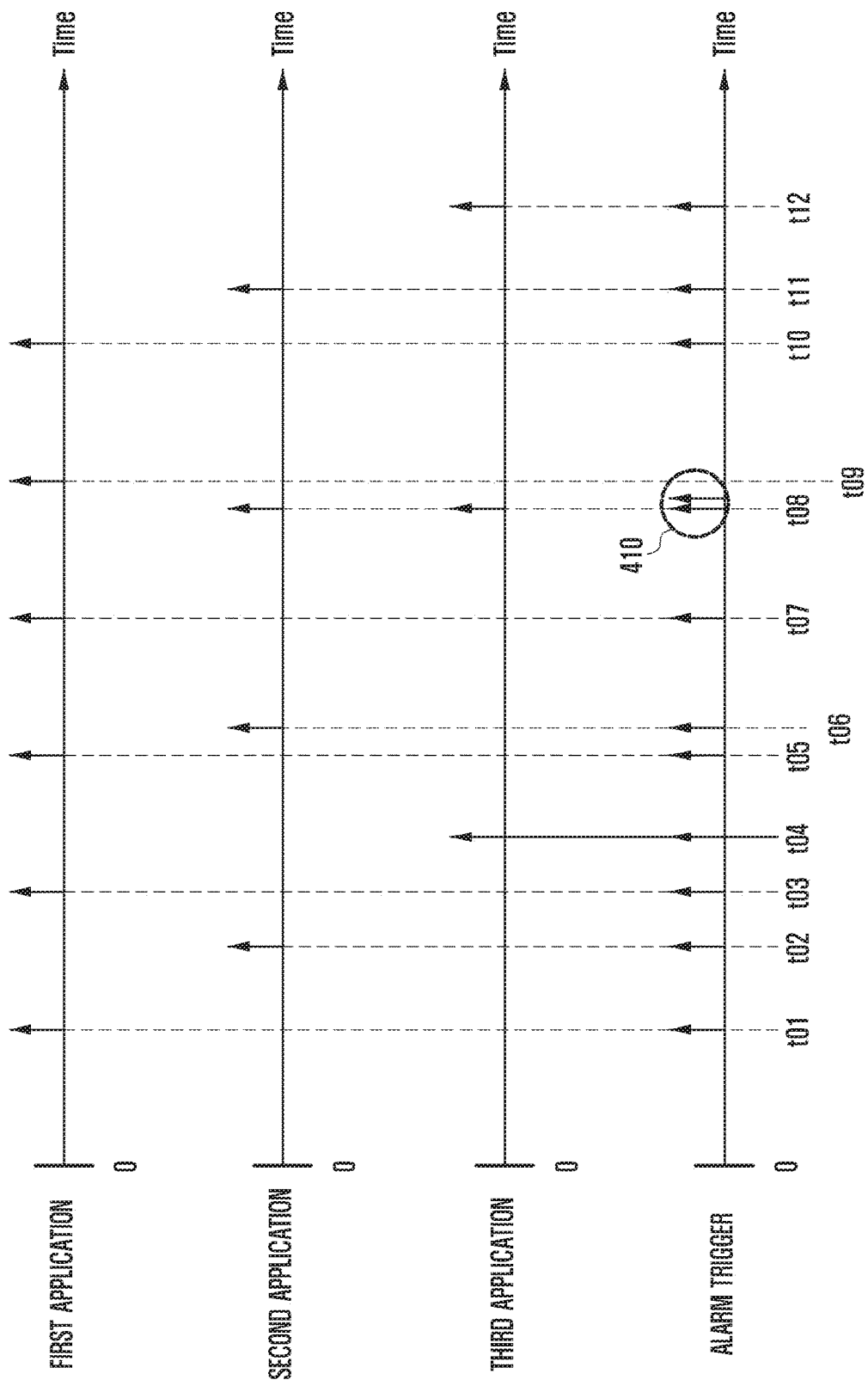
FIG. 4 is a timing diagram explaining a case where a periodic traffic occurs in three different applications.

FIG. 4 is a timing diagram explaining a case where a periodic traffic occurs in three different applications.

Referring to FIG. 4, first to third applications are shifted from a background state to an active state for data transmission/reception to transmit the traffic. The respective applications exist even in the case where only traffic transmission is performed, and exist even in the case where traffic transmission and reception are successively performed. It should be noted that they are not dividedly displayed in FIG. 4. Further, in the following description, even a case where traffic transmission and reception are successively performed may be explained as the traffic transmission.

Referring again to FIG. 4, a portion indicated as "0" on time axis as exemplified in FIG. 4 may be a time where the electronic device is shifted from an active state to an idle mode or a sleep mode. That is, explanation will be made on the assumption that the time in which the electronic device is shifted to the sleep mode is "0".

The first application is shifted to the active state at times of t01, t03, t05, t07, t09, and t10 to transmit the traffic. Further, the second application is shifted to the active state at times of t02, t06, t08, and t11 to transmit the traffic, and the third application is shifted to the active state at times of t04, t08, and t12 to transmit the traffic.

As described above, if the first to third applications are shifted to the active state at different times to transmit the traffic, traffic transmission or traffic transmission/reception is successively performed at each time from time t01 to time t12. Further, at a location denoted by reference numeral 410 in FIG. 4, the second application and the third application are awaken at the same time, and thus through once shifting to the active state, two different applications can transmit the traffic, respectively.

If the different applications perform the traffic transmission or traffic transmission and reception through once shifting to the active state, power consumption of the electronic device can be greatly reduced. Accordingly, the present invention provides an apparatus and a method capable of reducing the power consumption of the electronic device by reducing the number of times the electronic device is shifted to the active state through scheduling of the traffic transmission or traffic transmission and reception of the applications occurring at different times.

Figure 5:
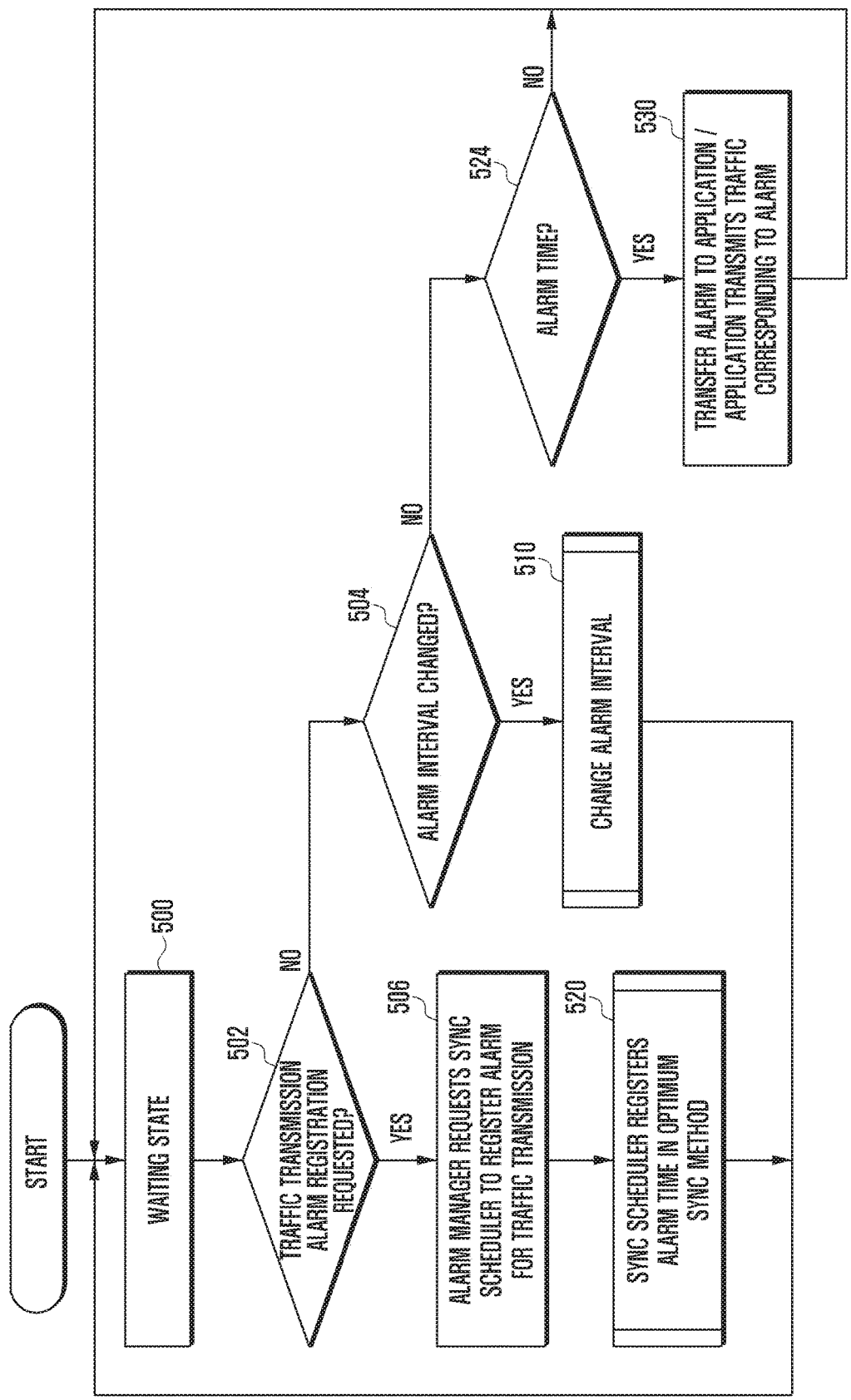
FIG. 5 is a flowchart explaining the control operation of an electronic device that transmits traffics through scheduling of alarm intervals of applications and changes the alarm intervals according to the present invention.

FIG. 5 is a flowchart explaining the control operation of an electronic device that transmits traffics through scheduling of alarm intervals of applications and changes the alarm intervals according to the present invention.

The control flowchart of FIG. 5 will be described using the block diagrams of FIGS. 1 to 3. At operation 500, the processor 120 maintains a waiting state. Such a waiting state may be an active state of the electronic device, a sleep mode, or an idle mode. Accordingly, the electronic device 101 may be in an active state, in a sleep mode, or in an idle mode. Accordingly, in the waiting state, respective applications operated in the processor 120 may request data transmission alarm registration.

In such a waiting state, the processor 120 proceeds to operation 502, and checks whether a traffic transmission alarm registration request occurs from at least one specific application. The traffic transmission alarm registration request is received by the alarm manager 231 operated in the processor 120. The traffic transmission alarm registration request may be generated as the respective applications operated in the processor 120 generate necessary alarms and transfer the generated alarms to the alarm manager 231. Accordingly, if the traffic transmission alarm registration request exists, the alarm manager 231 proceeds to operation 506 if the traffic transmission alarm registration request exists, whereas the alarm manager 231 proceeds to operation 504 if the traffic transmission alarm registration request does not exist.

Further, if the traffic transmission alarm registration request is not received as the result of the test at operation 502, the processor 120 proceeds to operation 504, and may check whether an alarm interval change is necessary. If the alarm interval change is necessary as the result of the checking at operation 504, the processor 120 proceeds to operation 510 to change the alarm interval. If the alarm interval change is not necessary as the result of the checking in operation 504, the processor 120 proceeds to operation 524. The alarm interval change at operation 510 will be described in more detail with reference to the drawings to be described later.

On the other hand, if the processor 120 proceeds to operation 506 through reception of the traffic transmission alarm registration request, the alarm manager 231 of the processor 120 requests the sync scheduler 221 to register the alarm for traffic transmission. That is, the alarm manager 231 receives an alarm registration request signal or message from the application that has requested the alarm registration for the traffic transmission, and converts the received signal or message into the form that can be processed by the sync scheduler 221 to provide the converted signal or message to the sync scheduler 221. Further, although not exemplified in FIG. 5, the traffic information acquirer 261 may observe the characteristics and intervals of the traffics transmitted by the respective applications, and may provide the traffic characteristic information for the respective applications to the sync scheduler 221.

Then, the sync scheduler 221 operated in the processor 120 may proceed to operation 520, select the optimum sync method using information included in the received alarm registration request message and the traffic characteristic information provided from the traffic information acquirer 261, and determine and register the alarm time in the selected sync method. The detailed operation at operation 520 will be described in more detail with reference to a flowchart to be described later.

On the other hand, if the alarm interval change request does not exist at operation 504, the sync scheduler 221 operated in the processor 120 may check whether the alarm time arrives at operation 524. The alarm times may be alarm times for the respective applications scheduled and stored at operation 520. Here, the checking at operation 524 may be a case where the sync scheduler 221 provided in the processor 120 checks alarm times of the applications pre-scheduled and registered, and checks whether a test result alarm is necessary. If the alarm time arrives as the result of the checking at operation 524, the sync scheduler 221 in the processor 120 proceeds to operation 530, and if the alarm time does not arrive, the processor 120 maintains the waiting state at operation 500.

If proceeding to operation 530, the sync scheduler 221 provided in the processor 120 transfers the alarm to the corresponding application that has requested the alarm. In this case, the alarm may be transmitted to one application or two or more applications. Accordingly, if the alarm is received at operation 530, the respective applications may be shifted to the active state to transmit the traffic corresponding to the alarm.

Figure 6:
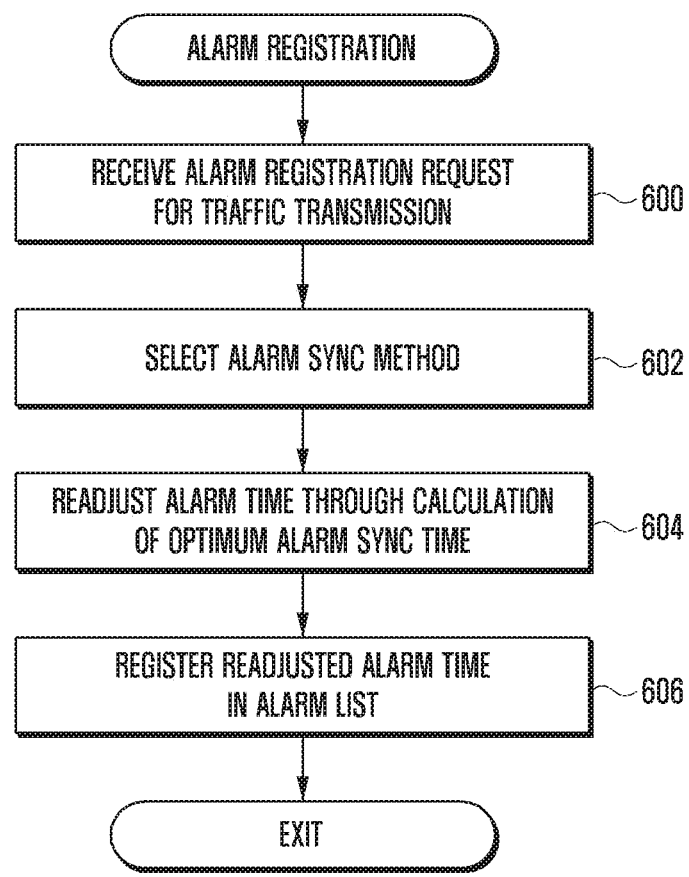
FIG. 6 is a flowchart explaining the control operation of a processor during alarm registration for respective applications operated in the processor according to the present invention.

FIG. 6 is a flowchart explaining the control operation of a processor during alarm registration for respective applications operated in the processor.

The control flowchart of FIG. 6 will be described using the configuration diagrams of FIGS. 2 and 3.

Referring to FIG. 6, the sync scheduler 221 receives from the alarm manager 231 an alarm registration request message for traffic transmission that is transferred from at least one specific application at operation 600. In this case, the alarm registration request message may include application information and interval information. Further, in FIG. 6, it is assumed that traffic type information to be transmitted is pre-received from the traffic information acquirer 261 as described above. If the alarm registration request for traffic transmission is received, the synchronizer 310 included in the sync scheduler 221 may proceed to operation 602, and may select an alarm interval sync method on the basis of the received alarm registration request message and the type of the pre-received traffic. As described above, the alarm sync method may be one of three methods, that is, a rounding method, a ceiling method, and a floor method.

The alarm sync method may be determined on the basis of the traffic type. The synchronizer 310 selects the alarm sync method at operation 602, and calculates the optimum alarm sync time using the alarm sync method selected at operation 604 to readjust the alarm time. Thereafter, the synchronizer 310 may store the alarm time readjusted at operation 606 in the alarm list 320. In this case, an identifier of each application and scheduled alarm trigger time information may be stored in the alarm list 320.

Then, alarm sync methods and a method for scheduling sync times in accordance with the respective methods will be described.

First, the rounding method will be described. The rounding method may be called a round-off method. The present invention has constant reference sync times, and the reference sync times are determined to have constant intervals. For example, on the basis of an example of FIG. 4 as described above, the reference sync times may have specific time intervals, such as in the unit of 5 minutes or 7 minutes from the time of "0" as intervals. As described above, the reference sync interval may be determined as a specific value. In this case, scheduling is performed with respect to the alarm request determined in the rounding method. That is, in the case of readjusting the alarm sync time using the rounding method, each alarm has a reference sync time that is closest to the time at which an alarm trigger is requested.

An alarm triggering time that is scheduled in accordance with the rounding method can be calculated as in mathematical expression 1.

$$x' = \text{rounding}(x) = \begin{cases} \left\lfloor \dfrac{x + \alpha \times T_{ref}}{T_{ref}} \right\rfloor * T_{ref} & x \geq \alpha \times T_{ref} \\ \left\lceil -\dfrac{x}{T_{ref}} \right\rceil * T_{ref} & x < \alpha \times T_{ref} \end{cases}$$ [Mathematical expression 1]

Here, $0 < \alpha < 1$

In mathematical expression 1, x' denotes a time at which an alarm is changed to be triggered through scheduling, and x denotes a time at which an alarm requested by an application is triggered. Further, in mathematical expression 1, $\alpha$ value may be 0.5, and may be adjusted as various values to match the actual use environment. Further, $T_{ref}$ denotes a reference sync interval value.

Now, rounding type scheduling will be described with reference to FIG. 7A. FIG. 7A is an exemplary diagram explaining a case where alarm times are scheduled in a rounding method according to the present invention.

In FIG. 7A, it is exemplified that $\alpha$ value is determined as 0.5. Further, as described above with reference to FIG. 4, it is exemplified that alarm is requested at different intervals with respect to three different applications. Further, it is assumed that alarm request intervals of the first to third applications are the same as those in FIG. 4.

Referring to FIG. 7A, the first application is an application that requires alarm generation in the unit of ½ of a reference sync interval if it is assumed that the reference sync interval is n. The second application is an application that requires alarm generation in the unit of an interval that is somewhat shorter than the reference sync interval, and the third application is an application that requires alarm generation in the unit of an interval that is somewhat longer than the reference sync interval.

Accordingly, with respect to the first application, it is necessary to generate alarms 701 and 702 twice from time of "0" to time of the first reference sync interval n, to generate alarms 703 and 704 twice from time of n to time of 2n, and to generate alarms 705 and 706 twice from time of 2n to time of 3n.

If such alarms are scheduled in the rounding method, the alarms 701 and 702 from time of "0" to time of the first reference sync interval n are generated twice at the time of the first reference sync period n, and the alarms 703 and 704 from time of n that is the second reference sync time to time of 2n are generated twice at the time of the second reference sync interval 2n. Further, the alarms 705 and 706 from time of 2n that is the third reference sync interval to time of 3n are generated twice at the time of the third reference sync interval 3n. That is, since the $\alpha$ value has a value of 0.5, scheduling is performed so that all the alarms located within the time of 1.5n are generated at the location of n, and all the alarms located at the time in the range of 1.5n to 2.5n are generated at the location of 2n.

In the same manner, with respect to the second application, only one alarm 711 exists within the time of 1.5n, and twice alarms 712 and 713 exist at the time in the range of 1.5n to 2.5n. Accordingly, at the time of n, the alarm is generated once with respect to the second application, and at the time of 2n, the alarm may be generated twice. Further, the second application has only once alarm 714 at the time in the range of 2.5n to 3.5n. Accordingly, it may be scheduled that only once alarm 714 is generated at the time of 3n.

In the same manner, with respect to the third application, only one alarm 721 exists within the time of 1.5n, and only once alarms 722 exist at the time in the range of 1.5n to 2.5n. Accordingly, at the time of n, the alarm is generated once with respect to the third application, and at the time of 2n, the alarm may be generated once. Further, the third application has only once alarm 723 at the time in the range of 2.5n to 3.5n. Accordingly, it may be scheduled that only once alarm 723 is generated at the time of 3n.

Accordingly, in the alarm list storage 320, alarms 701 and 702 of the first application, an alarm 711 of the second application, and an alarm 721 of the third application are stored as alarms to be generated at the time of n. Accordingly, through triggering for generating alarms, alarms are generated four times as denoted by a reference numeral 731 at the time of n, and alarms are generated five times as denoted by a reference numeral 732 at the time of 2n. Further, alarms are generated five times as denoted by a reference numeral 733 even at the time of 3n. That is, the respective applications may trigger the corresponding alarms to provide an alarm message, and may provide alarms so that the respective applications perform traffic transmission or traffic transmission/reception.

As described above, the rounding method may be a method to minimize a generation time error of an alarm trigger. It may be preferable to apply the rounding method if the traffic characteristic or pattern is a long-alive TCP connection.

Next, the ceiling method will be described. The ceiling method may be called a roundup method, and is a method to delay an alarm at a reference sync time that is larger than a trigger time requested from an application. The ceiling method may be a method to minimize the occurrence of an alarm trigger. The ceiling method may be applied to the traffic that is not greatly sensitive to the delay.

In applying the ceiling method, the present invention has constant reference sync times, and the reference sync times are determined to have constant intervals. For example, on the basis of an example of FIG. 4 as described above, the reference sync times may have specific time intervals, such as in the unit of 5 minutes or 7 minutes from the time of "0" as intervals. As described above, the reference sync interval may be determined as a specific value. In this case, scheduling is performed with respect to the alarm request determined in the ceiling method. That is, in the case of readjusting the alarm sync time using the ceiling method, scheduling is performed at the closest sync time among reference sync times delayed from the time at which an alarm trigger is requested for each alarm.

An alarm triggering time that is scheduled in accordance with the ceiling method can be calculated as in mathematical expression 2.

$$x' = \text{ceiling}(x) = \left\lceil \frac{x}{T_{ref}} \right\rceil * T_{ref} \qquad \text{[Mathematical expression 2]}$$

In mathematical expression 2, x' denotes a time at which an alarm is changed to be triggered through scheduling, and x denotes a time at which an alarm requested by an application is triggered. Further, in mathematical expression 2, $T_{ref}$ denotes a reference sync interval value.

Now, ceiling type scheduling will be described with reference to FIG. 7B. FIG. 7B is an exemplary diagram explaining a case where alarm times are scheduled in a ceiling method according to the present invention.

In FIG. 7B, it is exemplified that an alarm is requested at different intervals with respect to three different applications in the same manner as in FIG. 4 as described above. Further, it is assumed that alarm request intervals of the first to third applications are the same as those in FIG. 4.

Referring to FIG. 7B, the first application is an application that requires alarm generation in the unit of ½ of a reference sync interval if it is assumed that the reference sync interval is n. The second application is an application that requires alarm generation in the unit of an interval that is somewhat shorter than the reference sync interval, and the third application is an application that requires alarm generation in the unit of an interval that is somewhat longer than the reference sync interval.

Accordingly, with respect to the first application, it is necessary to generate alarms 701 and 702 twice from time of "0" to time of the first reference sync interval n, to generate alarms 703 and 704 twice from time of n to time of 2n, and to generate alarms 705 and 706 twice from time of 2n to time of 3n.

If such alarms are scheduled in the ceiling method, the alarms 701 and 702 from time of "0" to time of the first reference sync interval n are generated twice at the time of the first reference sync period n, and the alarms 703 and 704 from time of n that is the second reference sync time to time of 2n are generated twice at the time of the second reference sync interval 2n. Further, scheduling is performed so that the alarms 705 and 706 from time of 2n that is the third reference sync interval to time of 3n are generated twice at the time of the third reference sync interval 3n. This may be seen as the same method as that as described above with reference to FIG. 7A.

Next, alarms of the second application will be described. With respect to the second application, only one alarm 711 exists within the time of n, and once an alarm 712 exists even within the time of 2n. Further, once an alarm 713 exists even within the time of 3n. Accordingly, scheduling is performed so that, at the time of n, the alarm is generated once with respect to the second application, and at the time of 2n, the alarm is generated once. Further, scheduling is performed so that the alarm is generated once even at the time of 3n.

In the same manner, with respect to the third application, no alarm exists within the time of n. Accordingly, at the time of n, scheduling is performed so that the alarm is not triggered. In this case, one alarm 721 exists within the time of 2n, and once an alarm 722 exists even within the time of 3n. Accordingly, at the time of n, once an alarm is not generated with respect to the third application, but at the time of 2n, once an alarm may be generated. Further, scheduling may be performed so that the third application triggers once the alarm 722 even within the time of 3n.

Accordingly, in the alarm list storage 320, alarms 701 and 702 of the first application and an alarm 711 of the second application are stored as alarms to be generated at the time of n. Accordingly, through triggering for generating alarms, alarms are generated three times as denoted by a reference numeral 741 at the time of n, and alarms are generated four times as denoted by a reference numeral 742 at the time of 2n. Further, alarms are generated four times as denoted by a reference numeral 743 even at the time of 3n. That is, the respective applications may trigger the corresponding alarms to provide an alarm message, and may provide alarms so that the respective applications perform traffic transmission or traffic transmission/reception.

As described above, the ceiling method may be a method to less generate an alarm trigger. Accordingly, it may be preferable to apply the ceiling method if the traffic characteristic or pattern is not sensitive to the delay.

Last, the floor method will be described. The floor method is called a cutoff method, and is a method for moving up the time to the reference time that arrives earlier than the requested trigger time. For example, if an alarm trigger request interval is larger than 2n and smaller than 3n, the alarm trigger is requested at the time after 2n. Further, whether to generate the alarm trigger may be determined in the unit of n that is the determined reference sync interval. Accordingly, with respect to the alarm trigger requested with a value that is larger than 2n, the trigger is performed so that the alarm is generated at the time of n or 2n.

On the other hand, with reference to FIGS. 7A and 7B, only scheduling with respect to a periodic alarm has been described. However, even if a non-periodic alarm, that is, one-time alarm, is necessary, a requested alarm scheduling may be selected and performed to trigger the alarm.

Figure 8:
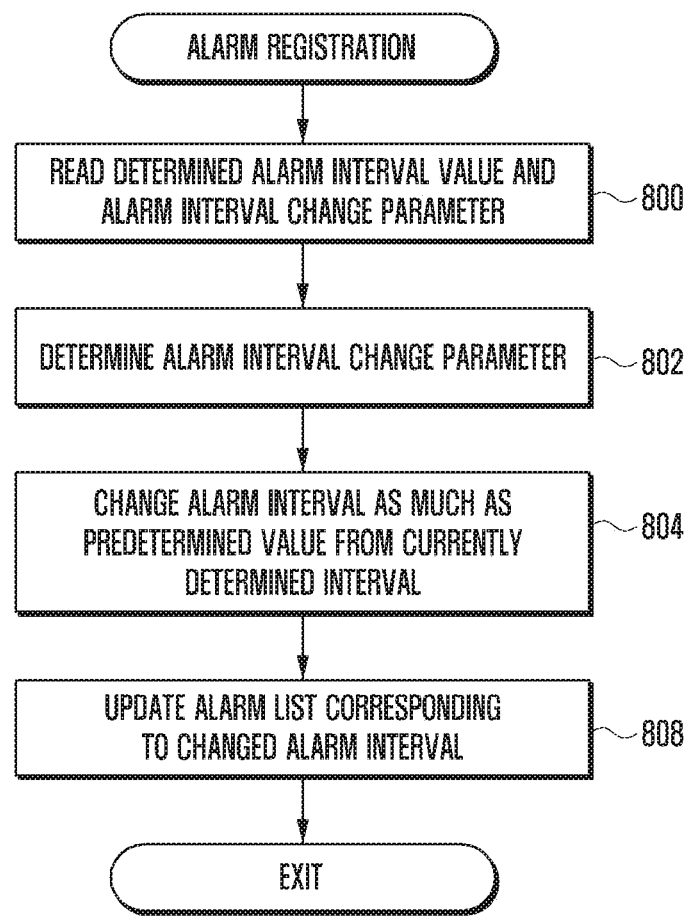
FIG. 8 is a control flowchart in the case where a reference sync interval is determined and changed according to the present invention.

FIG. 8 is a control flowchart in the case where a reference sync interval is determined and changed according to the present invention.

FIG. 8 may be an operation corresponding to an operation 510 of FIG. 5 as described above. The control flowchart of FIG. 8 will be described using the block diagrams of FIGS. 2 and 3. Further, as briefly described above, an alarm interval value may be provided from another external program, task, or operating system (OS) other than the sync scheduler 221, and the sync scheduler 221 may be configured to update the alarm interval through reception of an alarm interval change request signal. Hereinafter, for convenience in explanation, it is assumed that the synchronizer 310 of the sync scheduler 221 performs the alarm interval change.

A case where the synchronizer 310 included in the sync scheduler 221 proceeds to operation 800 may be a case where an alarm interval change is necessary as described above. The alarm interval change may be requested in the case where an elapsed time after the screen-off of the electronic device or an elapsed time after entering into a sleep mode or an idle mode exceeds a predetermined reference time.

For example, a reference sync interval value, which is an alarm interval, determined within one hour after entering into the screen-off, sleep mode, or idle mode may be determined as a T1 value, and a reference sync interval value, which is an alarm interval, determined within 2 hours after the one hour may be determined as a T2 value. Further, a reference sync interval value, which is an alarm interval, determined within four hours after the two hours may be determined as a T3 value. In this case, T1, T2, and T3 are values determined by a specific correlation between them. For example, the T2 value may be a value that can be acquired through an operation, such as multiplication or addition of the T1 value by or to a specific parameter value. In this case, the T3 value can also be acquired through an operation in a similar method.

However, the T1, T2, and T3 values may be values predetermined during manufacturing of the electronic device or through a specific application. For example, T1, T2, and T3 may be, for example, predetermined values, such as 5 minutes, 8 minutes, and 15 minutes, respectively. In this case, as information to be noted, the reference sync interval value should be determined to be shorter than a system time determined as a network address translation (NAT) time. If the reference sync interval value is determined to be longer than the NAT time, the address of the electronic device may become ineffective to cause the communication to be impossible. If the communication becomes impossible as described above, the electronic device should be shifted again to an active state to restart an initial operation. As a result, this may bring the results that are against the purpose of reducing the battery consumption of the electronic device according to the present invention. If the NAT time is 20 minutes, T1, T2, and T3 should have values that are smaller than 20 minutes.

Hereinafter, explanation will be made on the assumption that a reference sync interval that is an alarm interval is changed by the synchronizer 310 on the basis of a specific alarm interval change parameter.

If an alarm interval change request signal is received from outside, the synchronizer 310, at operation 800, reads a current alarm interval value and an alarm interval change parameter value. The alarm interval value is a value for recognizing whether it has an interval of the current T1 or an interval of T2, and the alarm interval change parameter may be a parameter corresponding to whether it is an interval change from T2 to T3 or an interval change from T1 to T2. Thereafter, at operation 802, the synchronizer 310 may determine the alarm interval change parameter for application using the currently read alarm interval value.

Accordingly, the synchronizer 310 may proceed to operation 804, and may calculate and determine the currently determined interval using the determined alarm interval change parameter. As the easiest method, it is assumed that the alarm interval change parameter is changed in the unit of one hour, the initial alarm interval change parameter value indicates two minutes, and the alarm interval parameter is twice increased in the unit of one hour. If the read value of the determined alarm interval change parameter is two minutes, the currently determined alarm interval parameter is T1, and the synchronizer 310 can recognize this as the time after one hour after entering into the screen-off, the sleep mode, or the idle mode. As the same example, if the read value of the alarm interval change parameter is four minutes, that is, T2, the synchronizer 310 can recognize this as the time after two hours after entering into the screen-off, the sleep mode, or the idle mode. Accordingly, if it is necessary to change the alarm interval change parameter from T2 to T3, the synchronizer 310 may determine the alarm interval change parameter as 8 minutes.

As another example, it is assumed that the initial reference sync interval is 3 minutes on the assumption that the alarm interval is changed in the unit of one hour and the alarm interval change parameter is increased by two minutes in the unit of one hour. If the currently determined alarm interval is three minutes, the synchronizer 310 can recognize this as the time within one hour after entering into the screen-off, the sleep mode, or the idle mode, and if the currently read alarm interval is five minutes, the synchronizer 310 can recognize this as the time after two hours after entering into the screen-off, the sleep mode, or the idle mode. This is because the read alarm interval corresponds to a state where the alarm interval change parameter value is added to the initial reference sync interval value. Accordingly, in the case of changing the alarm interval change parameter from T2 to T3, that is, if three hours elapse after entering into the screen-off, the sleep mode, or the idle mode, the synchronizer 310 may determine the reference sync interval as 7 minutes.

As still another example, it is assumed that the alarm interval is changed in the unit of one hour, the initial reference sync interval is 5 minutes, and the alarm interval change parameter is increased in the order of two minutes, three minutes, and four minutes in the unit of one hour. In this case, if the determined alarm interval read by the synchronizer 310 is 5 minutes, the synchronizer 310 can recognize this as the time within one hour after entering into the screen-off, the sleep mode, or the idle mode, and if the alarm interval is 7 minutes, the synchronizer 310 can recognize this as the time after one to two hours after entering into the screen-off, the sleep mode, or the idle mode. Accordingly, if the alarm interval change parameter is to be changed from T1 to T2, the synchronizer 310 may determine 10 minutes as the reference sync interval.

In the above-described method, the reference sync interval should be determined as the time interval that is smaller than a specific time determined on the system, for example, the time determined as NAT or a limit time similar to or different from the determined time.

Thereafter, at operation 806, the synchronizer 310 may update the alarm list to match the changed alarm interval. If the alarm period is dynamically adjusted as described above, accurate alarm can be provided only by updating the alarm list with respect to the alarm requests received from the respective applications.

According to the present invention as described above, as the number of applications installed in the electronic device becomes larger, the current consumption reduction effects can be increased. That is, power consumption of the electronic device can be reduced by presenting a reference time for activating the electronic device on the basis of a predetermined rule rather than activating the electronic device at different times for each application.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

INDUSTRIAL APPLICABILITY

The present invention is used in an electronic device having a communication function and mounted with applications.

The invention claimed is:

1. A method for controlling a traffic transmission time for transmitting a background traffic of an application installed in an electronic device having a communication function, comprising:
   if an application requests storing of an alarm to initiate transmitting of background traffic, determining a scheduling method based on characteristics of the background traffic;
   determining an alarm generation time based on the scheduling method, a time associated with the alarm, and a reference sync interval set to a time shorter than a network address translation (NAT) time; and
   when a current time corresponds to the alarm generation time, transmitting the background traffic corresponding to the application,
   wherein the reference sync interval is determined by a reference time value and a parameter determined for a time elapsed after the electronic device enters an idle mode.

2. The method of claim 1, wherein the scheduling method comprises one of a rounding method, a ceiling method, or a floor method.

3. The method of claim 1, wherein the NAT time is a maximum time that an address of the electronic device is valid in a communication network.

4. The method of claim 1, further comprising, if the reference sync interval is changed based on the time elapsed after the electronic device enters the idle mode, updating the alarm generation time to match a new reference sync interval.

5. The method of claim 4, further comprising, if the reference sync interval changes, updating a pre-stored scheduled alarm generation time to match a new reference sync interval.

6. The method of claim 1, further comprising:
   observing traffic transmitted from the application based on an alarm; and
   determining the characteristics of the background traffic based on the observation.

7. An alarm scheduling method for transmitting a background traffic of an application installed in an electronic device, comprising:
   if an application requests storing of an alarm to initiate transmitting of background traffic, determining a scheduling method based on characteristics of the background traffic;
   determining an alarm generation time based on the scheduling method, a time associated with the alarm, and a reference sync interval set to a time shorter than a network address translation (NAT) time; and
   when a current time corresponds to the alarm generation time, providing alarm information to the application,
   wherein the reference sync interval is determined by a reference time value and a parameter determined for a time elapsed after the electronic device enters an idle mode.

8. The alarm scheduling method of claim 7, wherein the scheduling method comprises one of a rounding method, a ceiling method, or a floor method.

9. The alarm scheduling method of claim 7, wherein the NAT time is a maximum time that an address of the electronic device is valid in a communication network.

10. The alarm scheduling method of claim 7, further comprising, if the reference sync interval is changed based on the time elapsed after the electronic device enters the idle mode, updating the alarm generation time to match a new reference sync interval.

11. The alarm scheduling method of claim 10, further comprising, if the reference sync interval changes, updating a pre-stored scheduled alarm generation time to match a new reference sync interval.

12. The alarm scheduling method of claim 7, further comprising:
   observing traffic transmitted from the application based on an alarm; and
   determining the characteristics of the background traffic based on the observation.

13. An electronic device for transmitting a background traffic of an application, comprising:
   a communication interface configured to perform communication with a server or another electronic device through a communication network;

a memory configured to store an application for transmitting the background traffic and a scheduler program for providing an alarm to the application; and a processor configured to:

if the application requests storing of an alarm to initiate transmitting of background traffic, determine a scheduling method based on characteristics of the background traffic, determine an alarm generation time based on the scheduling method, a time associated with the alarm, and a reference sync interval set to a time shorter than a network address translation (NAT) time, and when a current time corresponds to the alarm generation time, provide alarm information to the application, wherein the reference sync interval is determined by a reference time value and a parameter determined for a time elapsed after the electronic device enters an idle mode.

14. The electronic device of claim 13, wherein the processor is further configured to:

determine the scheduling method based on the characteristics of the background traffic and determine the alarm generation time based on the scheduling method, a time associated with the alarm, and the reference sync interval, observe characteristics of traffic transmitted from the application based on the alarm determine the characteristics of the background traffic based on the observation, store the alarm generation time, and provide the alarm information to the application.

15. The electronic device of claim 13, wherein the scheduling method comprises one of a rounding method, a ceiling method, or a floor method.

16. The electronic device of claim 13, wherein the NAT time is a maximum time that an address of the electronic device is valid in the communication network.

17. The electronic device of claim 14, wherein the reference sync interval changes in a predetermined time unit, and wherein, if the reference sync interval changes, the processor is further configured to update a pre-stored scheduled alarm generation time to match a new reference sync interval.

18. The method of claim 1, further comprising measuring the characteristics of the background traffic based on a length of a transmission control protocol (TCP) connection and a period of time between TCP connections.

19. The alarm scheduling method of claim 7, further comprising measuring the characteristics of the background traffic based on a length of a transmission control protocol (TCP) connection and a period of time between TCP connections.

20. The electronic device of claim 13, wherein the processor is further configured to measure the characteristics of the background traffic based on a length of a transmission control protocol (TCP) connection and a period of time between TCP connections.

\* \* \* \* \*